G. H. CHATILLON.
Spring-Scales for Weighing.
No. 196,434. Patented Oct. 23, 1877.
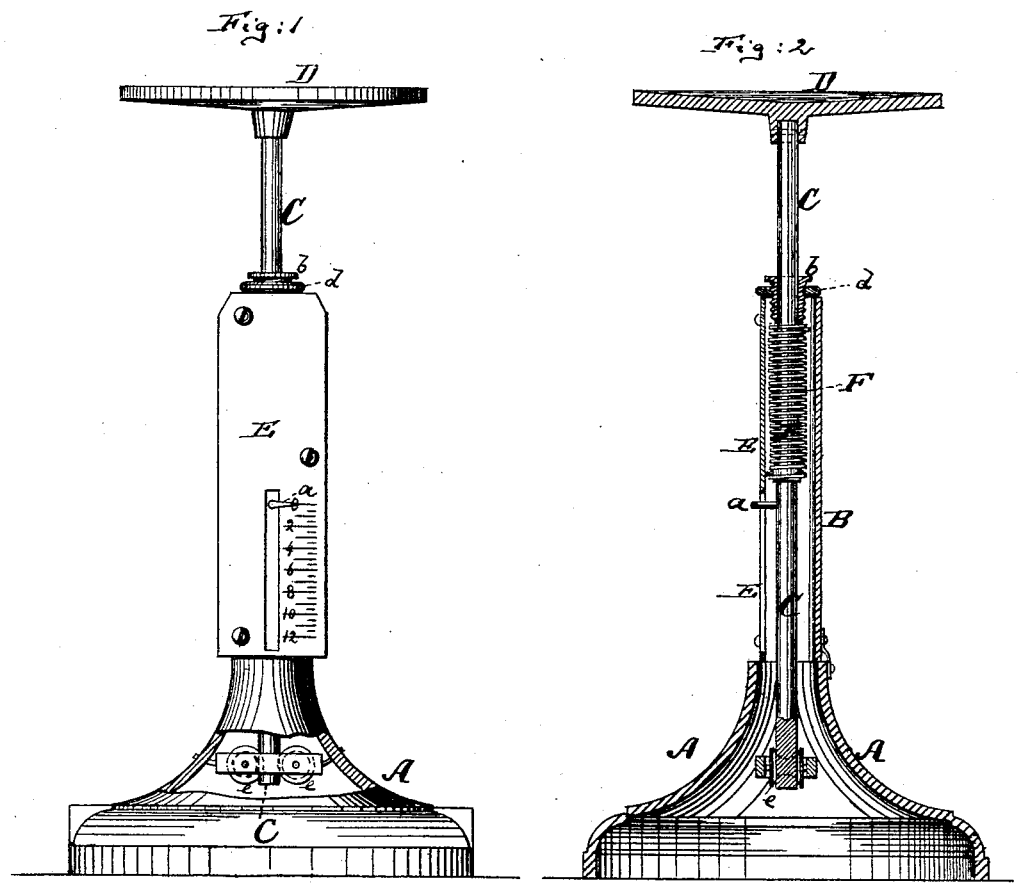
Witnesses:
John C. Tunbridge
A v. Briesen
Inventor:
George H. Chatillon
by his attorney
A. v. Briesen

UNITED STATES PATENT OFFICE.

GEORGE H. CHATILLON, OF NEW YORK, N. Y.

IMPROVEMENT IN SPRING-SCALES FOR WEIGHING.

Specification forming part of Letters Patent No. 196,434, dated October 23, 1877; application filed August 4, 1877.

*To all whom it may concern:*

Be it known that I, GEORGE H. CHATILLON, of New York city, in the county and State of New York, have invented a new and Improved Spring-Scale, of which the following is a specification:

Figure 1 is a front elevation, partly in section, of my improved spring-scale, and Fig. 2 a sectional elevation of the same.

Similar letters of reference indicate corresponding parts in both figures.

This invention relates to a new means of adjusting the position of the index hand or pointer of a spring-balance with reference to the graduated scale, for the purpose of enabling the user to bring the pointer to zero when a dish or other package intended to contain the matter to be weighed is placed upon the pan, thus enabling the dealer to weigh accurately from zero the matter placed into such receptacle.

In the accompanying drawing, the letter A represents the foot or frame of the scale. The upper part of this terminates in a vertical tube or hollow post, B, which constitutes a receptacle for the stem C of the scale-pan D. The stem C carries a pointer, a, which extends through a slot in the face-plate E of the post B, and moves along a graduated scale that is marked on said face-plate, as indicated in the drawing, and as is customary in all spring-scales. The stem C, where it enters the hollow post B, passes through a hollow screw, b, which is embraced by an annular nut, d, which rests upon and overlaps the upper end of the hollow post B. The spring F of the scale is with its lower end secured to the stem C, and with its upper end to the hollow screw b.

Now, in case a basket, plate, or box is placed upon the pan for the reception of the things to be weighed, it is only necessary to turn the nut d, and thereby move the hollow screw, the spring, and the stem C, and with the stem the pointer, along the index-plate until said pointer reaches the position of zero, which, of course, is a different position than would be occupied by the same pointer if the empty package had not been placed upon the pan. Being thus placed upon zero, the pointer will properly indicate the actual weight of the goods now placed into the package, and the dealer will be relieved from the difficulty of calculating or deducting the weight of the package, which heretofore, in ordinary scales, has been the objectionable feature in weighing goods in packages.

The lower part of the stem C is, in the hollow base A, guided between rollers e e, that are hung in said hollow base, as shown in Fig. 1. These rollers will serve to properly guide the stem in its upward and downward movements, and also, by revolving, relieve the same from undue friction.

I claim as my invention—

The combination of the annular nut d with the hollow screw b, stem C, hollow post B, and spring F, one end of the spring being attached to the stem C that passes through the screw b, and the nut d resting upon the post B, substantially as herein shown and described.

GEORGE H. CHATILLON.

Witnesses:
 ERNEST C. WEBB,
 LOUIS A. TRAUBERG.